United States Patent [19]

Le Dall

[11] 4,237,538
[45] Dec. 2, 1980

[54] ELECTRONIC MEANS FOR CONTROLLING THE REGENERATION OF RESINS IN A RESIN TYPE ION EXCHANGE DEVICE

[75] Inventor: Guy Le Dall, Rueil-Malmaison, France

[73] Assignee: Permo S.A., Rueil-Malmaison, France

[21] Appl. No.: 963,261

[22] Filed: Nov. 24, 1978

[51] Int. Cl.³ .................... G06F 15/46; B01D 15/04; C02F 1/42
[52] U.S. Cl. .................... 364/500; 210/662; 210/670; 210/138; 210/143; 364/107
[58] Field of Search .................... 210/24, 25, 30 R, 86, 210/87, 89, 96 R, 138, 139, 269, 277, 278; 364/500, 502, 107; 23/230 A; 422/110, 62, 67, 116, 68; 204/195 L

[56] References Cited

U.S. PATENT DOCUMENTS

| | | | |
|---|---|---|---|
| 3,964,999 | 6/1976 | Chisdes | 210/25 X |
| 4,025,426 | 5/1977 | Anderson et al. | 210/25 |
| 4,055,751 | 10/1977 | Bussmann et al. | 364/500 |
| 4,104,158 | 8/1978 | Davis | 210/25 |
| 4,145,279 | 3/1979 | Selby | 210/25 X |

Primary Examiner—Joseph F. Ruggiero
Attorney, Agent, or Firm—Wenderoth, Lind & Ponack

[57] ABSTRACT

The present invention is an electronic control means for use in a resin-type ion exchange apparatus requiring periodic resin regeneration. A microprocessor operating in accordance with programs stored in a memory and predetermined constants entered by a programming means controls the initiation and operation of the regeneration sequence. According to one embodiment the regeneration sequence is initiated at predetermined times. According to another embodiment the regeneration sequence is initiated when a predetermined amount of fluid has passed through the ion exchange apparatus. During the regeneration sequence the electronic control means controls the valves for the regeneration steps of backwashing, brining, rinsing and sterilization.

20 Claims, 10 Drawing Figures

ELECTRONIC MEANS FOR CONTROLLING THE REGENERATION OF RESINS IN A RESIN TYPE ION EXCHANGE DEVICE

BACKGROUND OF THE INVENTION

The present invention is related to resin-type ion exchange devices. Resin-type ion exchange devices have many uses such as the softening of water, deionization of sugar compounds and processing of protein complexes. As the fluid to be processed is passed through a tank containing an ion exchange resin, ions in the fluid to be processed are exchanged with ions found in the resin thereby removing objectionable ions from the fluid and exchanging them for less objectionable ions found in the resin. During the process the ability of the resin to exchange ions is gradually reduced, that is as the resin captures the objectionable ions and releases the less objectionable ions, its capacity to continue this exchange process is gradually exhausted. Eventually, a steady state is reached in which no further objectionable ions in the fluid to be processed can be exchanged for the less objectionable ions found in the resin. The point at which this state is reached can be estimated generally from the concentration of the objectionable ions found in the fluid to be processed, the volume of fluid to be processed passing through the ion exchange resin device, the relative chemical activities of the objectionable and less objectionable ions and other factors. Once this point is reached, the resin can no longer remove the objectionable ions from the fluid to be processed.

It is known in the art of ion exchange resin devices to regenerate the ion exchange resins by chemically removing the objectionable ions from the resin and replacing these with the less objectionable ions. This regeneration process requires the suspension of the ion exchanging process. During this regeneration process, a substance having a high concentration of the less objectionable ions is applied to the ion exchange resin. Because this produces a new balance of concentrations between the respective ions, the ion exchange resin now exchanges the objectionable ions captured during the ordinary process for the less objectional ions applied during regeneration. As a result of of this process, the ability of the ion exchange resin to remove objectionable ions from the fluid to be processed is regenerated. At the same time as the ion exchange resin is regenerated, the device may perform other functions such as backwashing the resin tank in order to remove trapped particulate matter, rinsing the resin tank to remove soluble materials and application of a sterilization agent to prevent bacterial growth.

Since this process of regeneration of the ion exchange resin renders the ion exchange device inoperable and since the ability of the ion exchange device to remove the objectionable ion is controlled in large part by the state of the ion exchange resin, it is most important that the regeneration process be undertaken at appropriate times. Too frequent regeneration of the ion exchange resin leads to unnecessarily rendering the ion exchange device inoperable as well as unnecessary use of energy and materials during the regeneration process. On the other hand, too infrequent regeneration of the ion exchange resins leads to an increase in the concentration of the objectionable ions at the output of the ion exchange device during the periods in which the capacity of the ion exchange resin is substantially exhausted.

SUMMARY OF THE INVENTION

Accordingly, the present invention proposes an electronic controlled means for use in a resin-type ion exchange device for selecting appropriate times for regeneration of the ion exchange resin.

According to one embodiment of the electronic control means of this invention, regeneration of the ion exchange resin is effected at predetermined time intervals set by the electronic control means.

According to a second embodiment of the present invention, regeneration of the ion exchange is effected when a predetermined amount of fluid passes through the ion exchange resin tank.

BRIEF DESCRIPTION OF THE DRAWINGS

The present invention will now be described in detail in conjunction with the accompany drawings, in which.

DETAILED DESCRIPTION OF THE PREFERRED EMBODIMENTS

Figure 1:
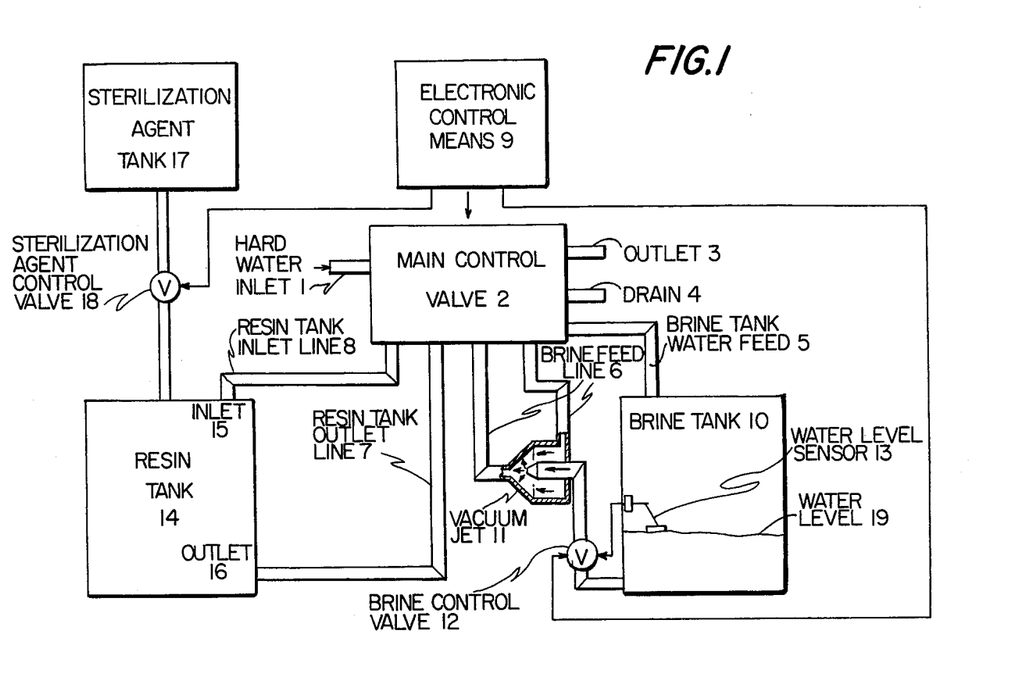
FIG. 1 illustrates one embodiment of the apparatus of the present invention used in conjunction with a water softening apparatus.

The electronic control means of the present invention will now be described in conjunction with a water-softening apparatus as illustrated in FIG. 1. It is to be understood that the water softening apparatus described in conjunction with the description of the apparatus of the present invention is but one example of a resin-type ion exchange apparatus to which the device of the present invention may be applied.

A water softening device to which the electronic control means may be applied is illustrated in FIG. 1. This water softening means includes a hard water inlet pipe 1 and a main control valve 2. Hard water to be treated enters the device through the hard water inlet 1 and is controlled as described below by the main control valve 2. Main control valve 2 may be of the type disclosed in U.S. Pat. No. 3,683,961 issued to Launay et al, Aug. 15, 1972, or any other equivalent known type control valve. The main control valve 2 is also coupled to outlet 3, drain 4, brine tank water feed 5, brine feed line 6, resin tank outlet line 7, resin tank inlet line 8 and is controlled by electronic control means 9. The brine tank water feed 5 is connected to brine tank 10. The brine feed line 6 is connected to vacuum jet 11. Also connected to vacuum jet 11 is brine control valve 12 which is further connected to brine tank 10 and which is controlled by electronic control means 9 and water lever sensor 13. The main control valve 2 is connected to resin tank 14 via two lines; the resin tank outlet line 7 is connected to the resin tank outlet 16; and the resin tank inlet line 8 is connected to the resin tank inlet 15. Sterilization agent tank 17 is also connected to resin tank 14 through sterilization agent control valve 18.

Figure 2A:
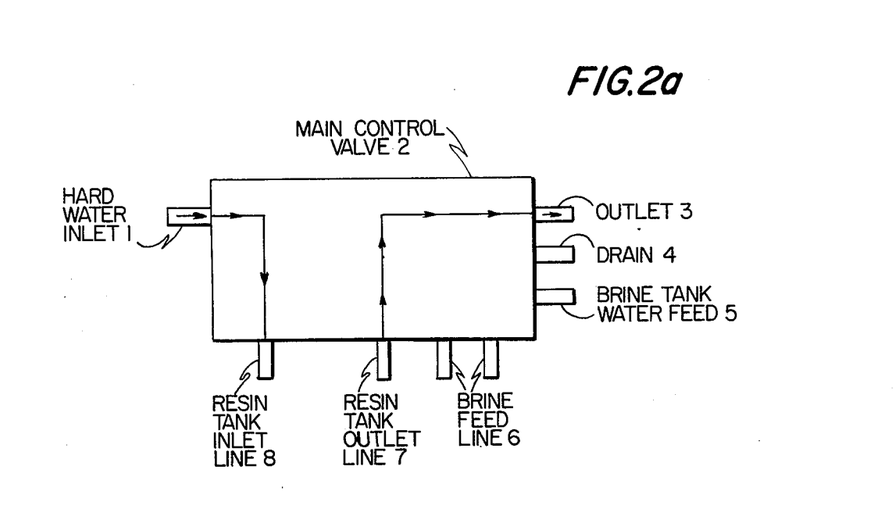
FIGS. 2a to 2d illustrate schematically the main control valve illustrated in FIG. 1 during various portions of the operational cycle of the device.

During the ordinary operation of the device, the flow through main control valve 2 is as illustrated in FIG. 2a. FIG. 2a shows water entering the device through hard water inlet 1 and passing through main control valve 2 to resin tank inlet line 8. From here the water passes through resin tank inlet 15, resin tank 14 where the objectionable ions are exchanged in the ion exchange resin for less objectionable ions, resin tank outlet 16 and resin tank outlet line 7. Resin tank outlet 7 is coupled to main control valve 2 where the water is directed to outlet 3. Thus, in the ordinary operating state of the device, hard water from hard water inlet 1 passes through resin tank 14 in the forward direction and is coupled out of the device by way of outlet 3. It is to be understood that flow of the water through tank 14 may be according to either the downflow principle or the upflow principle, both of which are known in the art and which are thus not further described or illustrated in detail.

The regeneration of the resin in resin tank 14 is accomplished in several steps. The first step in the regeneration process is a backwash or back flushing of the resin in resin tank 14. The second step in regeneration is application of brine from brine tank 10 to the resin in resin tank 14. Next the resin tank 14 is given a low pressure or low flow rate rinse. This step is followed by a final step involving a high pressure or high flow rate rinse coupled with application of water to the brine tank 10. The state of main control valve 2 during these regeneration steps is illustrated in FIGS. 2b and 2d.

Figure 2B:
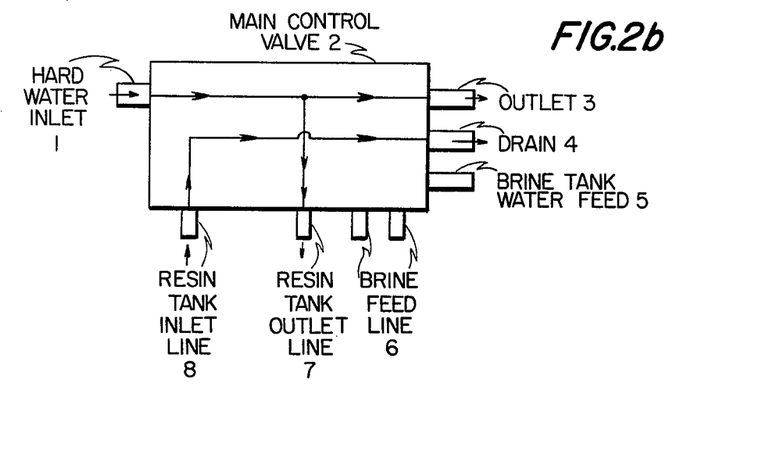
Figure 2C:
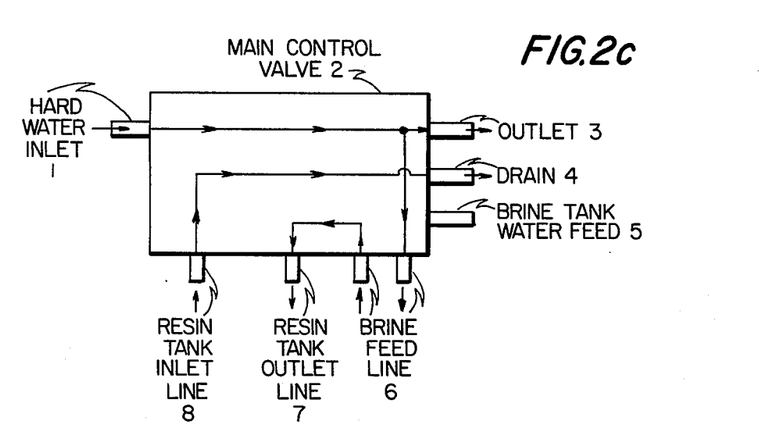
Figure 2D:
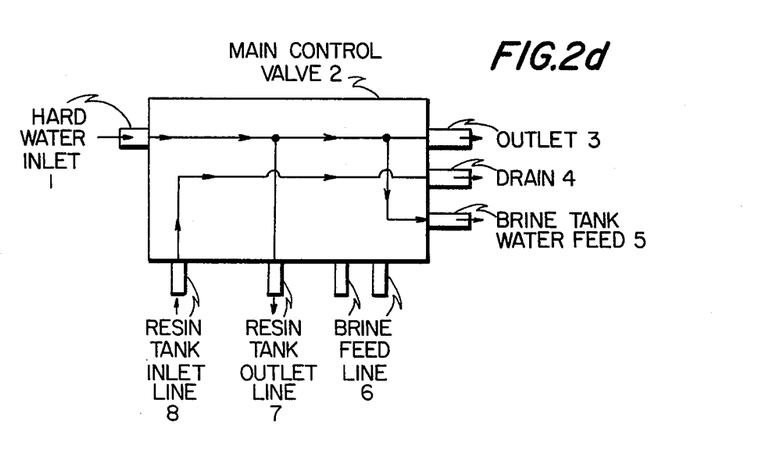

During the backwash or back flush process, the main control valve 2 is coupled as illustrated schematically in FIG. 2b. Hard water inlet 1 is coupled directly to outlet 3 through a bypass coupling. This bypass coupling is made so that water is available at the outlet of the water softening apparatus, even though unprocessed, during the regeneration process of the resin. Depending upon the application to which the resin-type ion exchange type is applied, it may be desirable to interrupt the fluid flow to outlet 3 during the regeneration process in order to prevent unprocessed fluid from leaving the ion-exchange device. In addition, hard water from hard water inlet 1 is applied to resin tank outlet line 7. This water flows into resin tank 14 through outlet 16 and exits resin tank 14 through inlet 15. This water is coupled by resin tank inlet line 8 and main control valve 2 to drain 4. In this state, hard water from hard water inlet 1 is passed through resin tank 14 in a reverse direction from the ordinary flow. This reverse flow serves to dislodge particulate matter trapped within resin tank 14 and flush it out of the system via drain 4. It is understood that drain 4 is to be coupled to a waste water inlet such as a sewer line. Thus, the particulate matter trapped in the resin tank 14 during the ordinary operation of the water softening device is flushed out of resin tank 14 and discarded.

The next step in the regeneration process is the application of brine from brine tank 10 to resin tank 14. Brine tank 10 is filled with the regeneration agent necessary to reverse the ion exchange process of the resin in resin tank 14, i.e. sodium ions. According to the technique usually employed in water softening devices of this type, brine tank 10 contains the regeneration agent partially covered with water. This technique insures that a highly concentrated solution of the brine and water is available for application to the resin in resin tank 14. FIG. 2c illustrates the flow through main control valve 2 during the brining step of the regeneration process. As explained above, hard water enters the device from hard water inlet 1 and is coupled to outlet 3 through a bypass pipe. As explained above, depending upon the particular application for the softened water, this bypass may be omitted so that no water exits the device through outlet 3. In addition, the hard water inlet 1 is connected to brine feed line 6. As illustrated in FIG. 1, brine feed line 6 is coupled to vacuum jet 11 and then has its opposite end also connected to main control valve 2. The flow of water from brine feed line 6 through vacuum jet 11 creates a vacuum which tends to draw the saturated brine solution from brine tank 10 through brine control valve 12. The means for controlling brine control valve 12 will be described below, however, the brine control valve 12 is always open during the brining step of the regeneration process. Thus, during the brining step saturated brine solution is mixed with the hard water in vacuum jet 11 to produce a diluted brine solution. As illustrated schematically in FIG. 2c, this diluted brine solution is passed through main control valve 2 and coupled to the resin tank outlet line 7. The thus prepared dilute brine solution passes through resin tank 10 in a reverse flow manner and is withdrawn through resin tank inlet 15 and resin tank inlet line 8. From here it passes through main control valve 2 and hence to drain 4 where it is discarded.

FIG. 1 illustrates one embodiment for the control of the opening and closing of brine valve 12. As illustrated in FIG. 1, brine control valve 12 is opened by a signal from electronic control means 9. This signal is produced by electronic control means 9 in conjunction with a signal applied to main control valve 2 to place it in the proper state for the brining step. The apparatus illustrated in FIG. 1 includes a water level sensor 13 which detects the water level 19 in the brine tank. When this water level is reduced a predetermined amount, indicating a predetermined amount of the brine solution is applied to resin tank 14, water level sensor 13 sends a signal to brine control valve 12 to close this valve. At this time, the brine solution is no longer drawn into resin tank 14 via vacuum jet 11. However, hard water from hard water inlet 1 is still applied to brine feed line 6 and enters resin tank 14 through vacuum jet 11. This water flow through resin tank 14 corresponds to the low flow rate rinse step of the regeneration process. Main control valve 2 remains in the same state as during the brining step, therefore, the rinse water exits resin tank 14 through inlet 15 and is coupled to drain 4 through resin tank inlet line 8 and main control valve 2. This flow of water serves to rinse the resin tank 14 and remove soluble matter.

Figure 3:
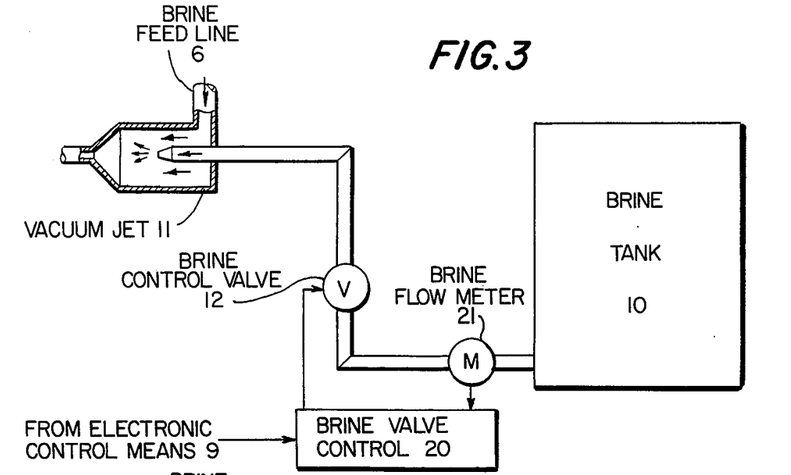
FIG. 3 illustrates an alternative embodiment of the control of the brining control valve illustrated in FIG. 1.

FIG. 3 illustrates an alternative embodiment for control of brine control valve 12. This embodiment illustrated in FIG. 3 includes brine valve control 20 and brine flow meter 21. Brine control valve 12 is opened by a signal from brine valve control 20 triggered by a signal from electronic control means 9. During the flow of brine from brine tank 10 to resin tank 14, brine flow meter 21 measures the rate of flow of the brine solution. This data is relayed to brine valve control 20 which calculates the total amount of brine solution entering rinse tank 14. When brine valve control 20 determines that a predetermined amount of brine solution has been applied to resin tank 14, it sends a signal to brine control valve 12 to close the valve. This predetermined amount of brine is selected with reference to the amount of resin in resin tank 14, the expected concentration of the brine solution in brine tank 10 and the chemical efficiency of the brine from brine tank 10 for regeneration of the resin in resin tank 14.

Figure 4:
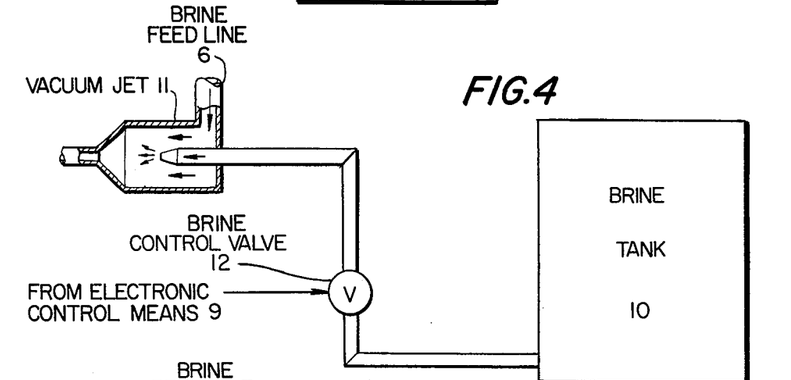
FIG. 4 illustrates another alternative embodiment of the control of the brining control valve illustrated in FIG. 1.

FIG. 4 illustrates a further modification of the control of brine control valve 12. FIG. 4 illustrates that brine control valve 12 is controlled solely by electronic control means 9. Brine control valve 12 is opened in conjunction with the start of the brining step and the placing of main control valve 2 into the state illustrated in FIG. 2c. Electronic control means 9 keeps brine control valve 12 opened for a predetermined period which is selected with regard to the expected concentration of the brine solution, the expected flow rate of the brine solution into resin tank 14, the volume of resin in resin tank 14 and the chemical efficiency of the brine for regeneration of the resin in resin tank 14.

Figure 5:
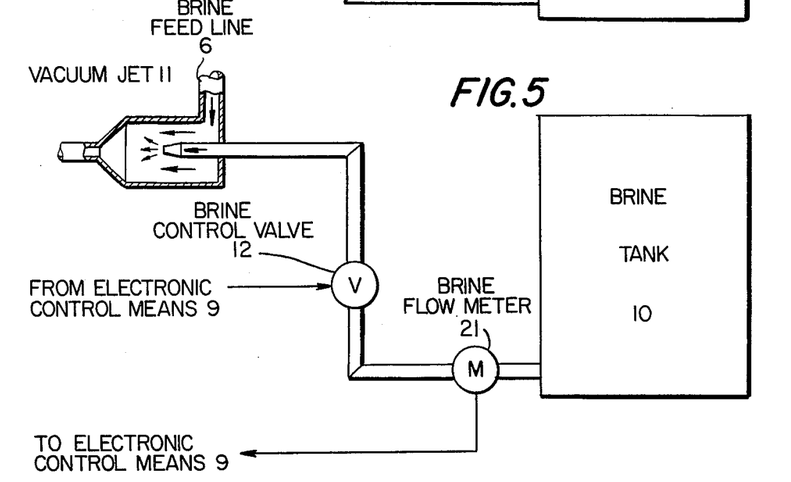
FIG. 5 illustrates a still further alternative embodiment of the control of the brining control valve illustrated in FIG. 1.

FIG. 5 illustrates a further modified embodiment of the control of brine control valve 12. FIG. 5 illustrates brine flow meter 21 which sends a data signal to electronic control means 9. In this embodiment, electronic control means 9 performs the function of brine valve control 20 described in conjunction with the system illustrated in FIG. 3. Thus, electronic control means 9 determines when a predetermined volume of brine solution has been applied to resin tank 14 and then closes brine control valve 12.

The next step in the regeneration process is the high flow rate rinse step. The coupling of main control valve 2 during the high flow rate rinsing step is illustrated schematically in FIG. 2d. As described above, the bypass from hard water inlet 1 to outlet 3 may be omitted depending upon the application to which the water is applied. As illustrated in FIG. 2d, main control valve 2 couples water from hard water inlet 1 to resin tank outlet line 7. This water flows through resin tank 14 from outlet 16 to inlet 15 and is returned to main control valve 2 through resin tank inlet line 8. As illustrated in FIG. 2d, main control valve 2 couples resin tank inlet line 8 to drain 4 where the water is discarded.

Also illustrated in FIG. 2d is a connection between hard water inlet 1 and brine tank water feed 5. This connection couples hard water from main control valve 2 into brine tank 10. This water falls to the bottom of brine tank 10 serving to resupply the water removed from brine tank 10 during the brining step. Thus, a concentrated brine solution is produced at the bottom of brine tank 10 for application to resin tank 14 during the next brining step. It is understood by those skilled in the art that this feed of water to brine tank 10 need not occur during the high flow rate rinse step but may occur at any convenient time after the brining step.

The final step in the regeneration process is application of a sterilization agent from sterilization agent tank 17 to resin tank 14. This sterilization agent serves to control the growth of bacteria or algae which may otherwise grow in resin tank 14. As illustrated in FIG. 1, sterilization agent tank 17 is coupled to resin tank 14 through sterilization agent control valve 18. Sterilization agent control valve 18 is controlled from electronic control means 9 to apply to predetermined amount of sterilization agent to the resin tank 14. Though FIG. 1 illustrates a gravity feed from sterilization agent tank 17 to resin tank 14, those skilled in the art would recognize that any other convenient means may be employed for the application of the sterilization agent such as a separate pump or an additional vacuum jet such as vacuum jet 11.

Those skilled in the art will understand that main control valve 2, brine control valve 12 and sterilization agent control valve 18 may be of any convenient type such as solenoid actuated valves or a servo-mechanism valves.

Figure 6:
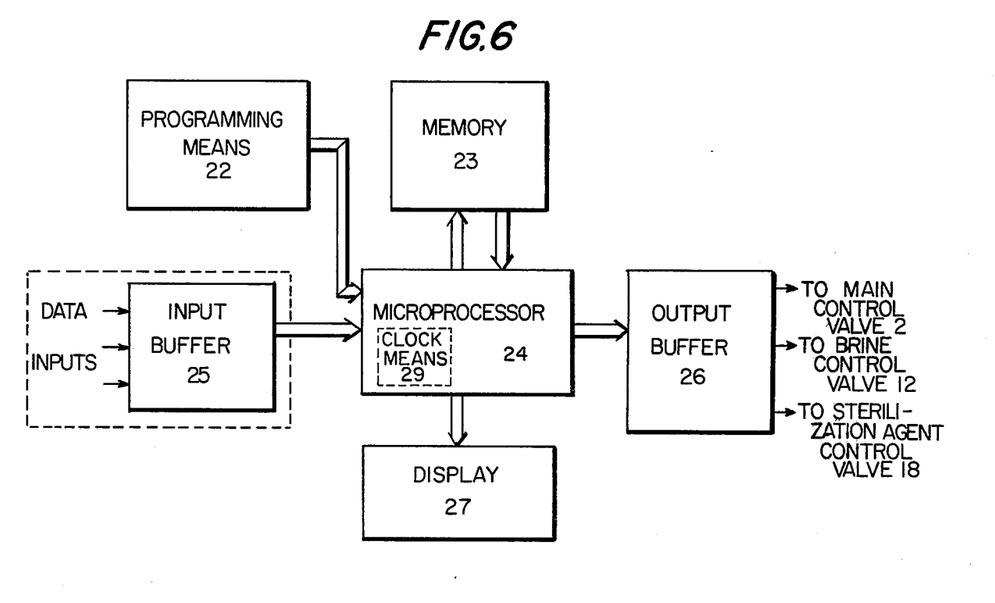
FIG. 6 is a block diagram of the control apparatus illustrated in FIG. 1.

Now the operation of electronic control means 9 will be described in conjunction with FIG. 6. The central feature of electronic control means 9 is microprocessor 24 which may be of any convenient type such as Texas Instruments TMF-1070. Microprocessor 24 is mutually coupled to memory 23 which serves to store the operational program of microprocessor 24, the programmed predetermined data and the intermediate values of calculations performed by microprocessor 24. The predetermined values necessary for the operation of the electronic control means are either permanently stored in memory 23 or entered into microprocessor 24 through programming means 22. Programming means 22 may take any convenient form such as a plurality of programming switches. It is preferred, however, that programming means 22 take the form of a counting programming means in conjunction with display 27. In this embodiment, actuation of a control in programming means 22 enables a counter in microprocessor 24 to be periodically incremented via an oscillator. The count of this counter is displayed on display 27. When the predetermined value desired is displayed on display 27, this control is deactuated and the number now stored in the counter portion of the microprocessor is applied to an appropriate portion of memory 23. Display 27 may also be employed to display previously stored predetermined constants under the control of programming means 22. The output of microprocessor 24 is applied to output buffer 26. Output buffer 26 translates the signal output from microprocessor 24 into the actual electrical signals necessary to operate the control valves. Microprocessor 24 may also receive input from input buffer 25. As described in further detail below, input buffer 25 serves to translate data from various measuring devices in the water softening apparatus of this embodiment into signals readable by microprocessor 24. The microprocessor control system illustrated in FIG. 6 is typical of the conventional type of circuit used in systems of this type. The structure and function of these microprocessor control systems are well understood by those skilled in the art. It is understood that one skilled in the art of microprocessor control systems, would be capable of making the design choices necessary to adapt the system illustrated in FIG. 6 to the particular application desired.

The electronic control means of the present invention will now be described in conjunction with a time base regeneration control system. In this embodiment, it is understood that microprocessor 24 has a clock means 29 incorporated therein such as possible with the use of Texas Instruments TMF-1070. First, this clock means incorporated in microprocessor 24 is set to the correct time by means of programming means 22 in conjunction with display 27. Ordinarily, display 27 is set to display the output of this clock means. Next, a predetermined interval between regeneration cycles is entered into memory 23 by means of programming means 22. As discussed above, this programming entry is preferably performed by means of enabling a counter in microprocessor 24 to be incremented repeatedly while the number stored in this counter is displayed on display 27. When the number displayed on display 27 corresponds to the length of the predetermined period between regeneration cycles, this number is entered into memory 23. It may be convenient to enter into memory 23 a time of day for starting each regeneration cycle and a number of days between each regeneration cycle. Thus, for instance, the microprocessor 24 may be programmed to initiate the regeneration cycle every third day at 2:00 am.

When the microprocessor 24 determines that it is time to initiate a regeneration cycle, a preprogrammed sequence stored in memory 23 is started. First, main control valve 2 is changed to the state illustrated in FIG. 2b to perform the backwashing step of the regeneration cycle. The time in which main control valve 2 remains in this state, that is the total time for the backwash cycle, may be a preprogrammed constant stored in memory 23 or may be entered by means of programming means 22 depending upon the particular application of the water softener illustrated in FIG. 1. When this time period has expired, microprocessor 24 commands main control valve 2 to assume the state illustrated in FIG. 2c. Preferably the total time of the brining and low flow rate rinse is set by means of programming means 22. In the embodiment illustrated in FIG. 1, brine control valve 12 is opened in response to a command from microprocessor 24 at the beginning of the brining step. This valve is closed by means of water level sensor 13 when a predetermined amount of brine solution has passed into resin tank 14.

Control of brine control valve 12 may also take the form illustrated in FIG. 3 in which electronic control means 9 opens brine control valve 12 by a signal applied to brine valve control 20. Thereupon, when a predetermined amount of brine solution whose value is stored in brine valve control 20 passes through brine flow meter 21, brine valve control 20 closes brine control valve 12.

The control of brine control valve 12 may be as illustrated in FIG. 4. In this embodiment, brine control valve 12 remains open a predetermined period under the control of electronic control means 9. This predetermined period may be permanently stored in memory 23 as a part of the regeneration program sequence or may be entered into memory 23 by means of programming means 22.

The control of brine control valve 12 may also take the form illustrated in FIG. 5. In this embodiment, electronic control means 9 performs the function performed by brine valve control 20 of FIG. 3. A signal from brine flow meter 21 is applied to electronic control means 9 by way of input buffer 25. Input buffer 25 converts the signal from brine flow meter 21 into a signal properly calibrated for operation thereon by microprocessor 24. Microprocessor 24 determines when the predetermined amount of brine solution (whose value is stored in memory 23) passes through brine flow meter 21. Upon making such a determination, microprocessor 24 closes brine control valve 12 via a signal coupled through output buffer 26. Since the amount of brine to be applied to resin tank 14 depends upon the known concentration of brine solution and the known chemical efficiency for regeneration of the particular brine employed and upon the volume of resin to be regenerated, this amount is preferably permanently programmed in memory 23.

Main control valve 2 remains in the state illustrated in FIG. 2c until the end of the slow flow rate rinse step. When microprocessor 24 determines that the preset length of time for the brining and slow flow rinse step has passed, it sends a signal to main control valve 2 through output buffer 26 to place it in the state illustrated in FIG. 2d. Thereupon the step of the high flow rate rinse is performed. According to the present embodiment, at the same time, hard water is coupled from hard water inlet 1 to brine tank water feed 5 to replace the water removed from brine tank 10 during the brining step.

When the amount of time for the high flow rate rinse step either permanently stored in memory 23 or stored therein by means of programming means 22 has passed, microprocessor 24 stops the high flow rate rinse step. At this time, a signal from microprocessor 24 coupled through output buffer 26 opens the sterilization agent control valve 18 to apply the sterilization agent from sterilization agent tank 17 to resin tank 14. This process continues for a predetermined time whose amount is either permanently stored in memory 23 or stored therein by means of programming means 22. Once this step is complete, the regeneration process is complete. Thereupon, microprocessor 24 sends a signal to main control valve 2 by way of output buffer 26 to place main control valve 2 into the state illustrated in 2a. Thus, the resin in resin tank 14 has been regenerated and the normal operation of the water softening device is restored.

Various other control functions may be performed via programming means 22. For example, programming means 22 may be capable of suspending the timed operation of microprocessor 24 to prevent initiation of the regeneration process during this suspension. This feature may be useful during a period of low water usage such as a vacation to prevent unnecessary regeneration steps when they are not required. The programming means 22 may also be enabled to restart this timed cycle from the point suspended. By this means, the total water usage time for the water softener and therefore the relative exhaustion state of the resin may be preserved. Programming means 22 may also enable the programming of the regeneration cycles on other than a simple repetitive basis. Thus, for instance, if there are periodic times during a week or other convenient period when water usage is especially high or especially low, the microprocessor 24 may be programmed to enable additional regeneration cycles during the high water use periods and fewer regeneration cycles during the low water usage periods on a predetermined basis. In addition, programming means 22 may enable manual initiation of the regeneration sequence. Thus, an additional regeneration cycle may be started at a time selected by the operator. Ideally, this manual initiation of the regeneration sequence would also reset the timer in microprocessor 24 so that the preset period between regeneration cycles is started from the end of the manually initiated regeneration cycle.

Figure 7:
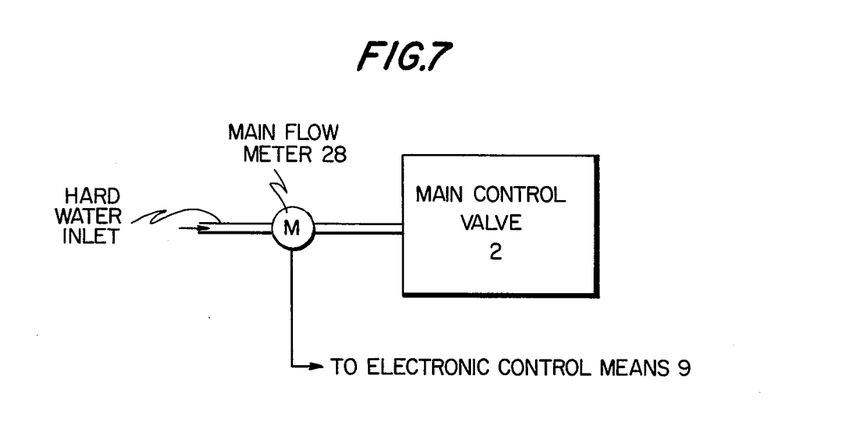
FIG. 7 illustrates an alternative embodiment of the control apparatus of the present invention including a fluid volume measuring device.

There will now be described a volume based regeneration time control in conjunction with the modified embodiment illustrated in FIG. 7. The system described above in which the regeneration cycle is performed at fixed predetermined times is not the ideal method to determine when regeneration is required. The water softener illustrated in FIG. 1 has a fixed volume of ion exchange resin in resin tank 14. In ordinary applications, the hardness of the water entering hard water inlet 1 does not vary greatly. Since the ion exchange resin has a fixed capacity for exchanging and the ion concentration of the water is relatively constant, the ion exchange resin is exhausted after processing a relatively fixed volume of water. That is, regardless of the time required, the ion exchange resin is exhausted when a fixed amount of water is processed. Thus, the apparatus of this embodiment is equipped with main flow meter 28 such as illustrated in FIG. 7.

Main flow meter 28 serves to measure the total hard water applied to the water softening apparatus through hard water inlet 1. Main flow meter 28 as well as brine flow meter 21 may comprise any suitable means for converting the flow of water into an electrical signal such as a turbine connected to a small electrical generator or a turbine having a magnet in one vane whose passage is detected by a magnetic proximity detector. This signal indicative of the amount of water flowing through the water softening device is applied to electronic control means 9 by way of input buffer 25. In this regard, the operation of electronic control means 9 illustrated in FIG. 6 is virtually identical to that described in conjunction with the time based system except that rather than measuring the present time and comparing that with the preset time stored in memory 23, microprocessor 24 integrates the total water flow through main flow meter 28 and compares this with a preset volume stored in memory 23. This preset volume is determined in relation to the volume and capacity of the ion exchange resin and the hardness of the water applied to hard water inlet 1. When microprocessor 24 determines that the predetermined amount of water has flowed through main flow meter 28, the regeneration cycle sequence is initiated as described above. The only major difference between this embodiment and the time based regeneration time control embodiment described above is that the initiation of the regeneration cycle is based upon the total water passing through the water softener rather than the total time. By this means, the electronic control means 9 automatically takes into account times of high water flow rate and low water flow rate and initiates the regeneration cycle at the same exhaustion state of the ionic exchange resin. Thus, regeneration takes place only when required thereby preventing exessive water and energy usage through unnecessary regeneration and also preventing deterioration in the quality of the water supplied through exhaustion of the ionic exchange resin.

Although the electronic regeneration control means disclosed in the present application has been described in conjunction with a water softening apparatus, those skilled in the art will readily appreciate that the above described technique can be employed in many other applications using ion exchange resins which must be periodically regenerated.

Further, although the electronic control means of the present invention has been described with regard to preferred structural features thereof, it will be understood that various modifications may be made to such specific structural features without departing from the scope of the present invention.

I claim:

1. In a resin-type ion exchange apparatus of the type requiring periodic resin regeneration and having an electrically actuated main control valve including an inlet, an outlet and a drain, a resin tank having a resin tank inlet and a resin tank outlet connected to said main control valve, a regeneration brine tank, a vacuum jet connected to said main control valve and a brine control valve connected to said regeneration brine tank and said vacuum jet, the improvement of an improved electronic control means comprising:

a memory means for storing therein a predetermined value loading program, a regeneration initiation program, a regeneration sequence control program and a plurality of predetermined values;

a microprocessor calculating means connected to said memory means (1) for loading a plurality of predetermined values into said memory means according to said predetermined value loading program, (2) for initiating a regeneration sequence according to said regeneration initiation program and at least one of said predetermined values, (3) for controlling said regeneration sequence according to said regeneration sequence program and at least some of said predetermined values by production of valve control signals (a) for causing said main control valve to couple said inlet and to said resin tank outlet and said resin tank outlet to said drain for backwashing said resin, (b) for causing said main control valve to couple said inlet to said vacuum jet, said vacuum jet to said resin tank outlet and said resin tank inlet to said drain and for causing said brine control valve to open for brining said resin, (c) for causing said main control valve to couple said inlet to said resin tank outlet and said resin tank outlet to said drain for rinsing said resin, and (d) for causing said main control valve to couple said inlet to said resin tank inlet and said resin tank outlet to said outlet for ordinary operation;

a programming means connected to said microprocessor calculating means for application of at least some of said predetermined values to said microprocessor calculating means for storing in said memory means; and an output buffer means connected to said microprocessor calculating means, said main control valve and said brine control valve for converting said valve control signals into electrical valve operating signals for controlling said main control valve and said brine control valve.

2. An electronic control means as claimed in claim 1 wherein:

said regeneration initiation program comprises the steps of initiating said regeneration sequence a predetermined time after the previous regeneration sequence; and said microprocessor calculating means includes a clock means incorporated therein and initiates said regeneration sequence by resetting said clock means upon completion of a regeneration sequence and by initiating said regeneration sequence when said clock means indicates an elapsed time equal to a predetermined value.

3. An electronic control means as claimed in claim 1 wherein:

said resin-type ion exchange apparatus further includes a flow measuring means for measuring the fluid flow into the ion exchange apparatus; and wherein said electronic control means further comprises an input buffer means connected to said flow measuring means and said microprocessor calculating means for applying an electrical signal to said microprocessor calculating means corresponding to the fluid flow measured by said flow measuring means;

said regeneration initiation program comprises the step of initiating said regeneration sequence after a predetermined amount of fluid has passed through said flow measuring means;

whereby said microprocessor calculating means initiates said regeneration sequence by calculating the amount of fluid that has passed through said fluid flow meter from said electrical signal corresponding to the fluid flow and by initiating said regeneration when said amount of fluid equals a predetermined value.

4. An electronic control means as claimed in claim 1 wherein:

said regeneration sequence control comprises the steps of (a) causing said main control valve to couple said inlet to said resin tank outlet and said resin tank outlet and said resin tank inlet to said drain for a predetermined period, (b) causing said main control valve to couple said inlet to said vacuum jet, said vacuum jet to said resin tank outlet and said resin tank inlet to said drain for a predetermined period, (c) causing said main control valve to couple said inlet to said resin tank outlet and said resin tank inlet to said drain for a predetermined period, and (d) causing said main control valve to couple said inlet to said resin tank inlet and said resin tank outlet to said outlet; and said microprocessor calculating means includes a clock means incorporated therein and controls said regeneration sequence by producing said valve control signals (1) for placing said main control valve into the above-described state (a) until said clock means indicates an elapsed time equal to a first predetermined value, thereafter (2) for opening said brine control valve and for placing said main control valve in the above-described state (b) until said clock means indicates an elapsed time equal to a second predetermined value, thereafter (3) for placing said main control valve in the above-described state (c) until said clock means indicates an elapsed time equal to a third predetermined value and thereafter (4) for placing said main control valve in the above-described state (d).

5. An electronic control means as claimed in claim 4, further comprising:

a water level detector disposed in said brine tank and coupled to said brine control valve for detecting the water level in said brine tank and for closing said brine control valve when said water level is less than a predetermined amount.

6. An electronic control means as claimed in claim 4, further comprising:

a brine flow meter disposed between said brine tank and said vacuum jet for producing a signal corresponding to the amount of brine flowing therethrough; and a brine valve control connected to said output buffer, said brine valve and said brine flow meter comprising said connection between said output buffer and said brine control valve for opening said brine valve upon reception of an electrical valve operating signal from said output buffer and for closing said brine valve when a predetermined amount of brine has flowed through said brine flow meter.

7. An electronic control means as claimed in claim 4, wherein:

said regeneration sequence program further comprises the step of closing said brine valve a predetermined time after said main control valve is placed in said state (b) and before said main control valve is placed in said state (c); and said microprocessor calculating means controls said regeneration sequence by producing said valve control signal to close said brine control valve when said clock means indicated an elapsed time equal to a fourth predetermined value whose value is greater than said first predetermined value and less than said second predetermined value.

8. An electronic control means as claimed in claim 4, further comprising:

a brine flow meter disposed between said brine tank and said vacuum jet for producing a signal corresponding to the amount of brine flowing therethrough;

an input buffer means connected to said brine flow meter and said microprocessor calculating means for applying an electrical signal to said microprocessor calculating means corresponding to the amount of brine following through said brine flow meter; and said microprocessor calculating means controls said regeneration sequence by producing said valve control signal for closing said brine valve when a predetermined amount of brine has flowed through said brine flow meter.

9. An electronic control means as claimed in claim 4, further comprising:

a sterilization agent tank for containing therein a sterilization agent for said resin;

a sterilization agent control valve connected to said sterilization agent tank, said resin tank and said output buffer means for controlling the flow of sterilization agent into said resin tank;

said regeneration sequence program further comprises the step of application of a predetermined amount of sterilization agent to said resin tank between said state (c) and said state (d);

said microprocessor calculating means controls said regeneration sequence by producing valve control signals for opening and closing said sterilization agent control valve for application of a predetermined amount of sterilization agent to said resin tank.

10. An electronic control means for initiating and controlling the resin regeneration sequence in a resin-type ion exchange apparatus of the type requiring periodic resin regeneration and having an electrically activated main control valve for controlling at least the regeneration sequence functions of backwashing, brining and rinsing, said control means comprising:

a memory means for storing therein a predetermined value loading program, a regeneration initiation program including at least the step of initiating regeneration a predetermined period after the previous regeneration, a regeneration sequence control program and a plurality of predetermined values;

a microprocessor calculating means including a clock means incorporated therein, said microprocessor calculating means connected to said memory means, for loading a plurality of predetermined values into said memory means according to said predetermined value loading program, for initiating a regeneration sequence comprising at least the steps of backwashing, brining and rinsing a predetermined period after the previous regeneration according to said regeneration initiation program and at least one of said predetermined values and for controlling said regeneration sequence by production of valve control signals according to said regeneration sequence control program and at least some of said predetermined values;

a programming means connected to said microprocessor calculating means for application of at least some of said predetermined values to said microprocessor calculating means for storing in said memory means; and an output buffer means connected to said microprocessor calculating means and the main control valve for converting said valve control signals into electrical valve operating signals for controlling the main control valve.

11. An electronic control means as claimed in claim 10, wherein:

said regeneration sequence control program comprises the steps of backwashing for a predetermined period, brining for a predetermined period and rinsing for a predetermined period; and said microprocessor calculating means controls said regeneration sequence by producing said valve control signals (1) for placing said main control valve in said backwashing state until said clock means indicates an elapsed time equal to a first predetermined value, thereafter (2) for placing said main control valve in said brining state until said clock means indicates an elapsed time equal to a second predetermined value, thereafter (3) for placing said main control valve in said rinsing state until said clock means indicates an elapsed time equal to a third predetermined value, and thereafter (4) for placing said main control valve in the ordinary operation state.

12. An electronic control means as claimed in claim 10 wherein:

said regeneration initiation program comprises the steps of initiating said regeneration sequence at a predetermined time of day a predetermined number of days after the previous regeneration sequence;

whereby said microprocessor calculating means initiates said regeneration sequence when said clock means indicates a time of day corresponding to a predetermined value, a number of days equal to a further predetermined value after the previous regeneration sequence.

13. An electronic control means as claimed in claim 10 wherein:

said programming means comprises means for suspending the operation of said clock means and means for restarting the operation of said clock means from the state prior to suspension.

14. An electronic control means as claimed in claim 10 wherein:

said programming means comprises means for manually initiating a regenerating sequence and means for resetting said regeneration initiation program.

15. An electronic control means as claimed in claim 10, further comprising:

a display means connected to said microprocessor calculating means for displaying the time remaining before initiation of the next regeneration sequence.

16. An electronic control means for initiating and controlling the resin regeneration sequence in a resin-type ion exchange apparatus of the type requiring periodic resin regeneration and having an electrically activated main control valve for controlling at least the regeneration sequence functions of backwashing, brining and rinsing, said control means comprising:

a fluid parameter measuring means for measuring at least one parameter of the fluid flowing into the resin-type ion exchange apparatus;

an input buffer means connected to said fluid parameter measuring means for generating an electrical signal corresponding to said at least one parameter measured by said fluid parameter measuring means;

a memory means for storing therein a predetermined value loading program, a regeneration initiation program including at least the step of initiating regeneration according to said at least one parameter measured by said fluid parameter measuring means, a regeneration sequence control program and a plurality of predetermined values;

a microprocessor calculating means connected to said input buffer means and said memory means for loading a plurality of predetermined values into said memory means according to said predetermined value loading program, for initiating a regeneration sequence comprising at least the steps of backwashing, brining and rinsing according to said regeneration initiation program, said electrical signal corresponding to said at least one fluid parameter measure by said fluid parameter measuring means and at least one of said predetermined values and for controlling said regeneration sequence by production of valve control signals according to said regeneration sequence control program and at least some of said predetermined values;

a programming means connected to said microprocessor calculating means for application of at least some of said predetermined values to said microprocessor calculating means for storing in said memory means; and an output buffer means connected to said microprocessor calculating means and the main control valve for converting said valve control signals into electrical valve operating signals for controlling the main control valve.

17. An electronic control means as claimed in claim 16, wherein:

said fluid parameter measuring means comprises a fluid flow measuring means for measuring the volume of fluid flow into the resin-type ion exchange apparatus;

said electrical signal generated by said input buffer means corresponds to said volume of fluid flow measured by said fluid flow measuring means;

said regeneration initiation program comprises at least the step of initiating said regeneration sequence after a predetermined amount of fluid has passed through said fluid flow measuring means; and said microprocessor calculating means initiates the regeneration sequence by calculating the volume of fluid that has passed through said fluid flow measuring means from said electrical signal corresponding to said volume of fluid flow and initiating said regeneration when said volume of fluid equals a predetermined value.

18. An electronic control means as claimed in claim 17, wherein:

said regeneration sequence control program comprises the steps of backwashing for a predetermined period, brining for a predetermined period and rinsing for a predetermined period; and said microprocessor calculating means controls said regeneration sequence by producing said valve control signals (1) for placing said main control valve in said backwashing state until said clock means indicates an elapsed time equal to a first predetermined value, thereafter (2) for placing said main control valve in said brining stage until said clock means indicates an elapsed time equal to a second predetermined value, thereafter (3) for placing said main control valve in said rinsing state until said clock means indicates an elapsed time equal to a third predetermined value, and thereafter (4) for placing said main control valve in the ordinary operation state.

19. An electronic control means as claimed in claim 17, wherein:

said programming means comprises means for manually initiating a regenerating sequence and means for resetting said regeneration initiation program.

20. An electronic control means as claimed in claim 17, further comprising:

a display means connected to said microprocessor calculating means for displaying the amount of fluid flow remaining before initiation of the next regeneration sequence.

* * * * *

Notice of Adverse Decision in Interference

In Interference No. 100,742, involving Patent No. 4,237,538, G. LeDall, ELECTRONIC MEANS FOR CONTROLLING THE REGENERATION OF RESINS IN A RESIN TYPE ION EXCHANGE DEVICE, final judgment adverse to the patentee was rendered July 30, 1982, as to claims 10-12 and 14-20.

[*Official Gazette November 9, 1982.*]